United States Patent
Weik et al.

[19]

[11] Patent Number: 5,943,320
[45] Date of Patent: Aug. 24, 1999

[54] METHOD OF CHARGING FOR THE USE OF A TELECOMMUNICATIONS SERVICE, AS WELL AS A SWITCHING SYSTEM, A SERVICE CONTROL POINT, AND A NETWORK MANAGEMENT FACILITY

[75] Inventors: Hartmut Weik, Stuttgart; Uwe Stahl, Leonberg; Wolfgang Lautenschlager, Weissach-Flacht; Lothar Krank, Leonberg; Rüdiger Falkner, Ditzingen, all of Germany

[73] Assignee: Alcatel Alsthom Compagnie Generale d'Electricite, Paris, France

[21] Appl. No.: 08/763,530

[22] Filed: Dec. 12, 1996

[30] Foreign Application Priority Data

Dec. 16, 1995 [DE] Germany .................. 195 47 194

[51] Int. Cl.⁶ .................................................. H04M 15/10
[52] U.S. Cl. ................ 370/259; 364/705.06; 379/91.02; 379/115; 379/207; 379/134; 379/113; 705/34
[58] Field of Search ................ 370/259; 364/705.06; 379/91.02, 127, 135, 201, 91.01, 115, 111, 207, 114, 112, 116, 133, 134, 126, 124, 113; 395/200.53, 1; 705/34

[56] References Cited

U.S. PATENT DOCUMENTS

| | | | |
|---|---|---|---|
| 4,796,292 | 1/1989 | Thomas | 379/91.01 |
| 5,003,584 | 3/1991 | Benyacar et al. | 379/91.02 X |
| 5,146,491 | 9/1992 | Silver et al. | 379/114 |
| 5,148,474 | 9/1992 | Haralambopoulos et al. | 379/111 |
| 5,223,699 | 6/1993 | Flynn et al. | 379/91.01 X |
| 5,450,477 | 9/1995 | Amarant et al. | 379/91.02 |
| 5,469,497 | 11/1995 | Pierce et al. | 379/115 |
| 5,539,884 | 7/1996 | Robrock, II | 379/112 X |
| 5,715,394 | 2/1998 | Jabs | 395/200.53 |
| 5,774,533 | 6/1998 | Patel | 379/127 |

FOREIGN PATENT DOCUMENTS 0452591  10/1991  European Pat. Off. .

OTHER PUBLICATIONS

"Services Offered by Intelligent Networks" by X. du Vachat et al, in Electrical Communication vol. 63, No. 4, 1989, pp. 331 to 336, no month.
"Intelligent Network Products" by J.P. Euzen et al, in Electrical Communication vol. 63, No. 4, 1989, pp. 321 to 330, no month.
Telecommunications Management Network (TNM): Architektur, Schnittstellen und Anwendungen, by Falkner, et al in NTZ, vol. 43, Book 6, 1990, pp. 466–469, no month.
"Voice services on the intelligent network: intelligent peripherals and service nodes". by F. Bosco in CSELT Technical reports. vol. XX—No. 4, Aug. 1992, pp. 347–352.

Primary Examiner—Michael Horabik
Assistant Examiner—William H. Wilson, Jr.
Attorney, Agent, or Firm—Ware, Fressola, Van Der Sluys & Adolphson LLP

[57] ABSTRACT

The invention relates to a method for charging for the use of a telecommunication service, as well as to a switching system, a service control point and a network management facility. A service request is transmitted from a subscriber (A) via a telecommunication network (KN) of a network operator to a service-providing unit (SAPP1) of the service provider. A charge unit (BILL) of the network operator administers the charge collection for the use of the telecommunication service. The service-providing unit (SAPP1) provides the requested telecommunication service only after receipt of a confirmation message from a authorization unit (AUT) of the network operator. The charge message (M6) with data relating to a charge for using the telecommunication service is transferred from the service-providing unit (SAPP1) to the charge unit (BILL) and the charge unit (BILL) collects the charge after the confirmation message has been received.

11 Claims, 3 Drawing Sheets

METHOD OF CHARGING FOR THE USE OF A TELECOMMUNICATIONS SERVICE, AS WELL AS A SWITCHING SYSTEM, A SERVICE CONTROL POINT, AND A NETWORK MANAGEMENT FACILITY

TECHNICAL FIELD

The invention relates to a method for charging for the use of a telecommunication service of a service provider. It is also directed to a switching system for a telecommunications network of a network operator with a service switching unit for routing a service request from a subscriber to a service-providing unit of a service provider, and with a charge unit of the network operator for collecting charges for the use of a telecommunications service provided by the service-providing unit.

It is still further directed to a service control point for telecommunications services, comprising an interface to a service switching facility of a telecommunications network, means for receiving a service request from a subscriber via the service switching facility, and a service-providing unit of a service provider for providing a telecommunications service in response the service request.

It is also directed to a network management facility of a network operator for a telecommunications network including a service switching facility for routing a service request from a subscriber to a service-providing unit of a service provider, the network management facility comprising a charge unit of the network operator for charging for the use of a telecommunications service provided by the service-providing unit.

BACKGROUND OF THE INVENTION

The number of telecommunication services offered in a communication network continues to increase. The invention addresses a group of such telecommunication services known under the name "Kiosk Services."

A potential implementation and realization of this group of services according to the IN concept (IN=intelligent network) is described in the article "Dienste in Intelligenten Netzen" ("Services in intelligent networks") by X. Du Vachat et al., Elektrisches Nachrichtenwesen, Vol. 63, No. 4, 1989.

A communication network comprises so-called service switching points providing a service user with access to the kiosk service. The kiosk service itself is implemented in a so-called service control point via a service program. In this case, the kiosk service is not provided by a network provider, meaning the public or private company which operates the network and provides the IN-infrastructure for the services, but by a service provider.

Here, a service request is routed from the service user via the service switching point to the service control point which provides the kiosk service. A kiosk service of this type comprises, for example, an information service providing weather forecasts, stock reports and sports results, where the service user is charged a higher charge than the basic calling charge. Charging this higher charge is implemented by using a faster charge pulse rate for the connection to the kiosk service in the communication network. Consequently, both the charges for using the kiosk service and the basic telephone toll charges are automatically charged to the telephone account of the service user and collected by the network operator.

This method for charging for a kiosk service is disadvantageous in that the charge for the kiosk service is strongly linked to the charge for the basic telephone toll charges. As a result, the service provider is severely limited in designing his charge concept.

SUMMARY OF THE INVENTION

It is therefore an object of the invention to establish a charge method for telecommunication services where the charge for the telecommunication service is to a large extent decoupled from the charge for the basic connection charge.

This objective is solved by a method for charging for the use of a telecommunication service comprising the steps of routing a service request from a subscriber through a telecommunications network of a network operator to a service-providing unit of the service provider, and collecting the charge for the use of a telecommunications service by means of a charge unit of the network operator, characterized in that the service-providing unit does not provide the requested telecommunications service until it receives a confirmation message from the authorization unit of the network operator, that a charge message with data on a charge for the use of the telecommunications service is transferred from the service-providing unit to the charge unit, and that the charge unit collects the charge if the confirmation message has been provided.

A further objective is a switching system for a telecommunications network of a network operator with a service switching unit for routing a service request from a subscriber to a service-providing unit of a service provider, and with a charge unit of the network operator for collecting charges for the use of a telecommunications service provided by the service-providing unit, characterized in that the switching system further comprises an authorization unit which is designed to send to the service-providing unit a confirmation message which causes the service-providing unit to provide the telecommunications service, and that the charge unit is designed to receive from the service-providing unit a charge message with data on a charge for the use of the telecommunications service and to collect the charge if the confirmation message has been provided.

Another objective is a service control point for telecommunications services, comprising an interface to a service switching facility of a telecommunications network, means for receiving a service request from a subscriber via the service switching facility, and a service-providing unit of a service provider for providing a telecommunications service in response the service request, characterized in that the service-providing unit comprises means for receiving a confirmation message from an authorization unit of the network operator, means for sending a charge message containing data on a charge for the use of a telecommunications service to a charge unit of the network operator which serves to collect the charge if the confirmation message has been provided, and control means which are so designed that the requested telecommunications service is not provided until the confirmation message is received.

A still further objective is a network management facility of a network operator for a telecommunications network including a service switching facility for routing a service request from a subscriber to a service-providing unit of a service provider, the network management facility comprising a charge unit of the network operator for charging for the use of a telecommunications service provided by the service-providing unit, characterized in that the network management facility further comprises an authorization unit designed to send to the service-providing unit a confirmation message which causes the service-providing unit to provide the telecommunications service, and that the charge unit is designed to receive from the service-providing unit a charge message with data on a charge for the use of the telecommunications service and to collect this charge if the confirmation message has been provided.

The invention is based on the concept to provide the service only after authorization by the network operator and to have the network operator only then collect a charge established by the service provider.

The invention enables a service provider to employ completely new methods for charging for the use of his service. It would, for example, be possible to establish a fixed charge for using this service, independent of the duration of the use of the service.

In order to prevent authorization errors by the network operator, the unit providing the service advantageously transmits data regarding the usage charge of the service to the unit responsible for the authorization even before the authorization is initiated. In addition, the authorization unit advantageously collects data about the service user and uses this information as a basis for deciding about an authorization.

BRIEF DESCRIPTION OF THE DRAWINGS

The invention is hereinafter described by way of three embodiments with reference to the accompanying drawings.

BEST MODE FOR CARRYING OUT THE INVENTION

In the first embodiment, there is shown the implementation of the method of the invention for charging for the use of a telecommunication service in a communication configuration comprising a switching system according to the invention and a service control point according to the invention.

Figure 1:
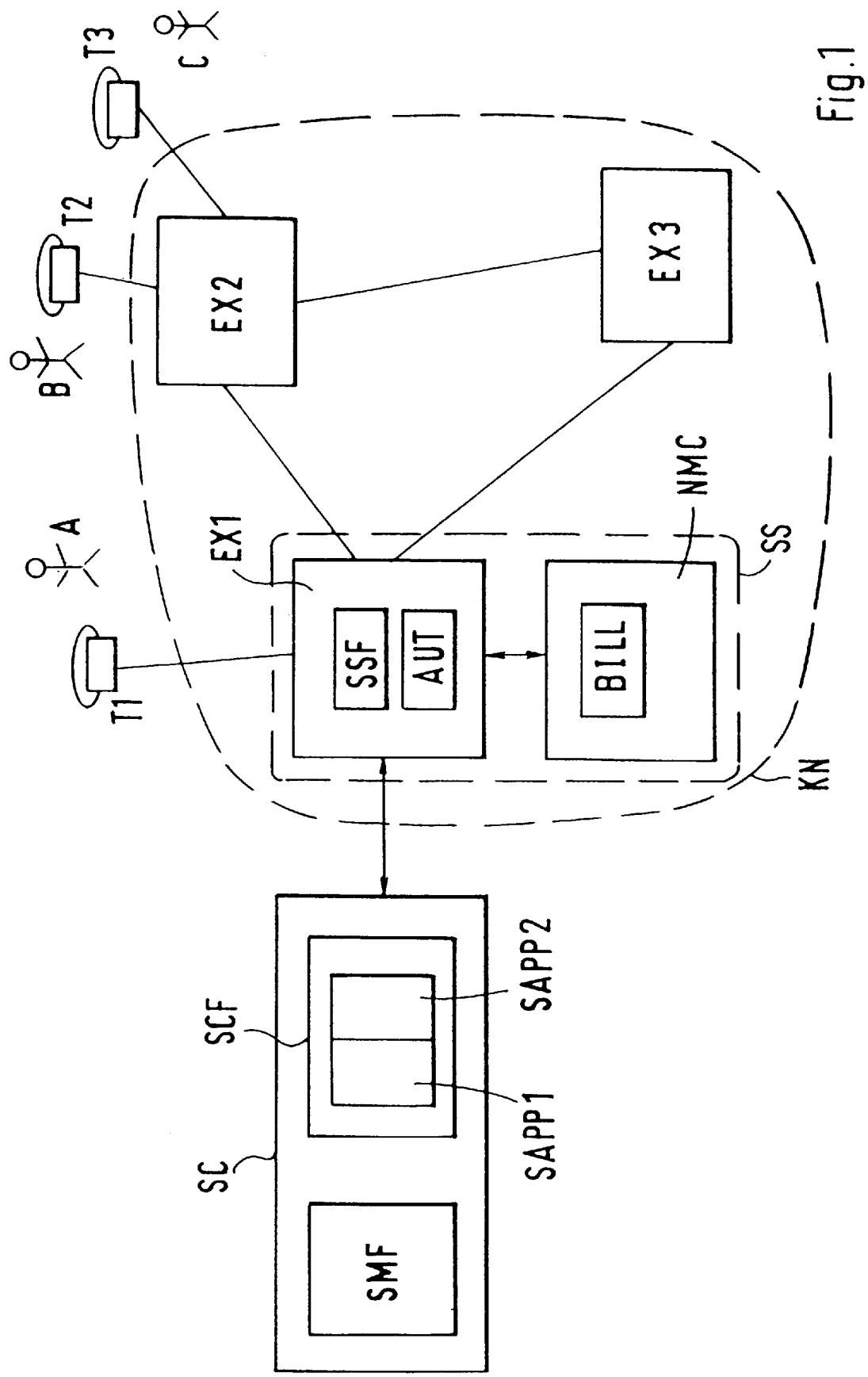
FIG. 1 shows a block circuit diagram of a communication configuration with a communication network and a service control point according to the invention.

FIG. 1 shows a service control point SC, a communication network KN, three terminals T1 to T3 and three subscribers A to C assigned to the terminals T1, T2 and T3, respectively. The communication network KN is connected to the service control point SC and to the terminals T1 to T3.

The terminals T1 to T3 are terminals for a telecommunication network. The terminals T1 and T2 are conventional terminals. The terminal T3 is a public telephone terminal. Terminal T3 could, for example, be a coin-operated telephone, a card-operated telephone or a club telephone. The number of terminals connected to the communication network KN is merely given as an example. Terminals T1 to T3 may also be different types of terminals for communication networks, for example computer systems, picture telephones or fax machines.

The communication network KN is designed like a conventional telephone network. It comprises three intermeshed switching facilities EX1 to EX3 and a network management facility NMC. The switching facility EX1 and the network management facility NMC exchange data and form a switching system SS. The switching facility EX1 exchanges data with the service control point SC.

The switching facilities EX1 to EX3 are conventional switching centers for a telephone network. The design of the switching facility EX1 is rather specific. Implemented in the control of the switching facility EX1 are additional service switching functions, which form a service switching unit SSF and which upon recognizing that a connection has been requested, query the service control facility SC by using a special service identification, and which receive from the service control facility SC as a reply thereto instructions relating to the further disposition of the connection request. With these service switching functions, the switching facility EX1 functions as a service switching point according to the IN concept (IN=intelligent network). For example, the article "Produkte für intelligente Netze" (Products for intelligent networks) by J. -P. Hautzen, Elektrisches Nachrichtenwesen, Vol. 63, No. 4, 1989, describes how a service switching point of this type and consequently also the switching facility EX1 are implemented.

The switching facility EX1 furthermore comprises an authorization unit AUT. In this case, the authorization unit AUT is in the form of software modules which are implemented in the control of the switching facility EX1. When the authorization unit AUT is queried by the service control point SC, it decides if the charges for using a telecommunication service provided by the service control point SC can be collected by a charge unit of the network operator. If this is possible, the authorization unit AUT sends a confirmation message to the service control point SC.

It is also possible that additional switching facilities of the communication network KN are designed like the switching facility EX1, thereby providing access to the service control point SC.

The network management facility NMC operates and manages the switching facility EX1. It is possible that the network management facility NMC provides these functions also for the switching facilities EX2 and EX3.

The network management facility NMC is based on a computer system which is connected to the switching facility EX1 via a management interface, for example a Q3 interface. Aside from the conventional network management functions, such as error management, configuration management, execution management and backup management, the network management facility NMC also manages the accounting functions for subscribers of the communication network KN of the network operator. For this purpose, the network management facility NMC provides a charge unit BILL which is formed by the corresponding software modules executed on the computer system of the network management facility NMC. The charge unit BILL records the call meter readings for subscriber lines of the communication network KN, processes the charge data and provides accounting and bill collection for these subscribers. For this purpose, it manages, for example, telephone billing accounts assigned to subscribers, for which periodic invoices are created or charges are settled with credit card services. In addition to the charges for using the communication network KN of the network operator, the charge unit BILL also collects the charges for telecommunication services from service providers which are rendered by the service control point SC.

The design of the network management facility NMC can, for example, be found in the article "Telecommunication Management Network (TMN): Architektur, Schnittstellen und Anwendungen" (Telecommunication Management Network (TMN): Architecture, Interfaces and Applications) by R. Faulkner et al., NTZ, Vol. 43, Book 6, 1990.

It is also possible that the network management facility NMC is assigned to a different switching facility of the communication network KN. This would preferably be the subscriber switching station of the subscriber who requested service from the service control point SC.

The switching facility EX1 and the network management facility NMC form a switching system SS. A switching system is defined as a system which provides the functions of the authorization unit AUT and of the charge unit BILL. It is also possible that the functions of the network management facility NMC are integrated in the switching facility EX1, whereby the switching system SS is formed by the switching facility EX1.

The service control point SC is based on a computer system which is connected to the switching facility EX1 via, for example, a No. 7 communication network. This computer system provides a platform for software modules which execute the functions of a service control node and a service management system according to the IN concept. Here, the platform comprises a service switching unit SCF and a service management unit SMF which execute the respective functions.

It is also possible that the service management unit SMF and the service switching unit SCF are formed by two different computer systems connected via, for example, an X.25 network. Here, the service control point would be formed by the computer having the service switching unit SCF.

The basic design of the service control point SC can, for example, be found in the aforementioned article "Produkte fur intelligente Netze" ("Products for intelligent networks") by J. -P. Hautzen, Elektrisches Nachrichtenwesen, Vol. 63, No. 4, 1989.

The service switching unit SCF comprises two service-providing units SAPP1 and SAPP2. The number of service-providing units is chosen only as an example. Each of the service-providing units SAPP1 and SAPP2 provides a telecommunication service of a network operator. For this purpose, they communicate with the switching facility EX1 via a data link. By way of this link, they affect the subsequent processing by the switching facility EX1 of a request directed to them, for example the routing of this request to a specific telephone number of the communication network KN. In addition, they can also ensure the establishment of an active connection to the requesting subscriber and send to the subscriber via this active connection, for example, voice messages. These voice messages may also be provided by associating with the switching facility EX1 a service support system (Intelligent Peripheral) which provides the voice messages and communicates with the service control point SC via the service switching facility EX1 or directly. The design of such service support system can, for example, be found in the article "Voice services on the intelligent networks: intelligent peripherals and service nodes" by F. Bosco, CSELT Technical reports, Volume XX, No. 4, 1992.

The service-providing unit SAPP1 provides a telecommunication service of a service provider, for the use of which the service user is charged. This service is preferably an information service, but it may generally be any service. The charge for the use of the service is, at least partially, not collected by a charge unit of the service provider, but by the network operator of the communication network KN.

After receipt of a service request, the service-providing unit SAPP1 provides the telecommunication service only after a confirmation message is received from the authorization unit AUT indicating that the network operator agrees to accept the charges for using the telecommunication service. After the service has been provided, the service-providing unit SAPP1 sends a message with the charge for the use of the service to the charge unit BILL.

The implementation of the charge method is described hereinafter with reference to FIG. 2a.

Figure 2A:
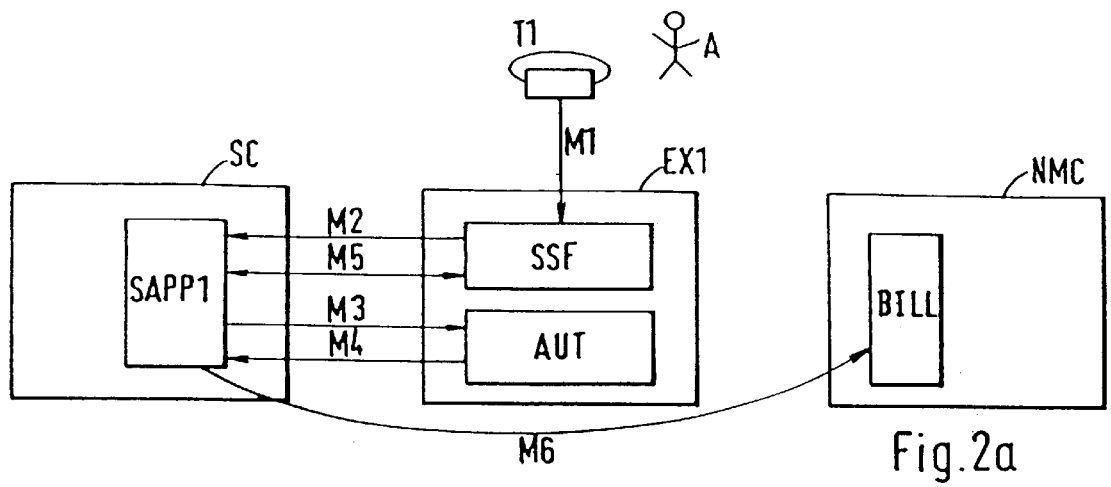
FIG. 2a shows a symbolic representation of the execution of the method of the invention for a first embodiment.

FIG. 2a shows the terminal T1, the associated subscriber A, the service control point SC, the service-providing unit SAPP1, the switching facility EX1 with the service switching unit SSF and the authorization unit AUT, as well as the network management facility NMC with the charge unit BILL.

As a service request, the subscriber A transmits via the terminal T1 a routing request M1 with the service identification of the telecommunication service provided by the service-providing unit SAPP1, which is routed to the switching facility EX1 by the communication network KN. The subscriber A may also use a different method to effect a service request, for example, lifting the receiver by itself may be viewed as a service request.

The service switching unit SSF recognizes the service request for the service provided by the service-providing unit SAPP1 and routes the service request to the service by sending a corresponding message M2 to the service-providing unit SAPP1. After receipt of the message M2, the service-providing unit SAPP1 sends a message M3 to the authorization unit AUT. The message M3 contains data about the subscriber submitting the service request and about the expected charges for using the service. The message M3 is in this case interpreted by the authorization unit AUT as a request for the network operator to assume the charge.

The message M3 may also be omitted. For example, a message with the corresponding data could be sent from the service switching unit SSF directly to the authorization unit AUT when a service request for the service-providing unit SAPP1 is recognized. It is also possible that the service-providing unit SAPP1 or the service switching unit SSF send only a requesting message to the authorization unit AUT, wherein the authorization unit AUT itself subsequently collects the data required to make a decision.

The authorization unit AUT makes a decision based on the data contained in the message M3 or on other data which it compiled, if the charges for the service to be provided by the service-providing unit SAPP1 will have to be collected by the charge unit BILL of the network operator. If this is the case, it will send a confirmation message M4 to the service-providing unit SAPP1. When the message M4 is recognized, the service-providing unit SAPP1 will provide the requested service to the subscriber A. For this purpose, the service-providing unit SAPP1 exchanges messages M5 with the service switching unit SSF.

After the service has been provided, the service-providing unit SAPP1 calculates the charge for using the service. It is also possible to charge a fixed amount. Subsequently, a message M6 containing data about the calculated charge is sent to the charge unit BILL. The charge unit BILL of the network operator then collects this charge.

The messages M2 and M5 are exchanged via the communication mechanisms of the IN concept. These communication mechanisms can also be used for exchanging the messages M3 and M4. However, it is also possible to establish a separate (logical) link between the service-providing unit SAPP1 and the authorization unit AUT. This link could be based on a different transport network, for example a X.25 network. The message M6 can be exchanged, on one hand, via the standard communication methods between the switching facility EX1, the service control point SC and the network management facility NMC. On the other hand, a separate communication link may also be established between the service-providing unit SAPP1 and the network management facility NMC based, for example, on a No. 7 signaling network or on a X.25 network.

The aforedescribed method for charging for services is not restricted to services provided via the IN concept. For example, the service-providing unit SAPP1 may be integrated in the control of the switching facility EX1, whereby the service is provided by the switching facility EX1. The process flow and the communication relations follow in similar fashion from FIG. 1 and FIGS. 2a to 2b.

The authorization unit AUT will be described hereinafter in greater detail with reference to the flow diagram shown in FIG. 3.

Figure 3:
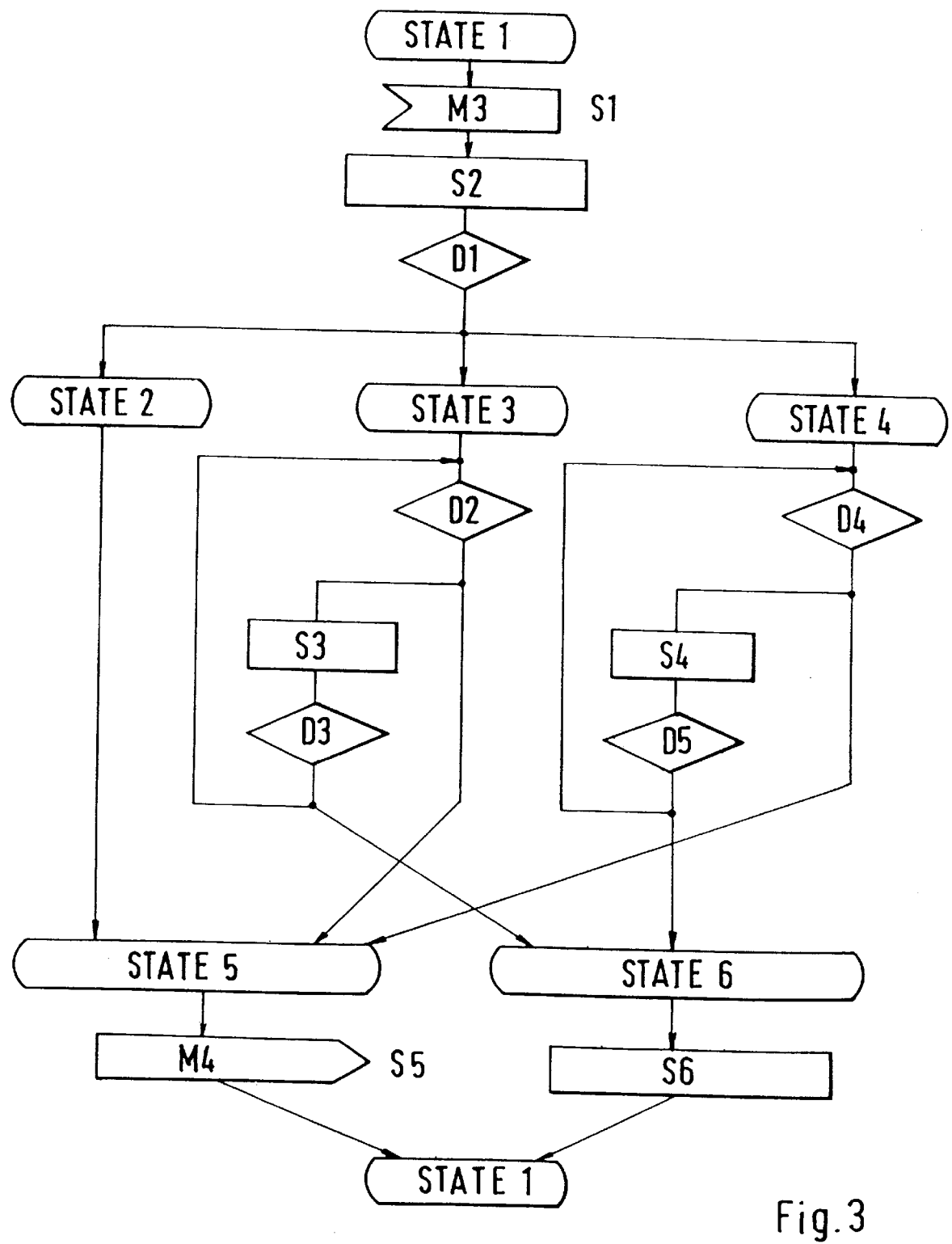
FIG. 3 shows a flow diagram for the method of the invention according to FIGS. 2a to 2c.

FIG. 3 shows six states STATE1 to STATE6, six steps S1 to S6 and five ranches D1 to D5.

Before the message M3 is received, the authorization unit AUT is in a waiting state, the state STATE1. After the message M3 is received (step S1), parameters assigned to the subscriber submitting the connection request are determined in step S2.

These parameters specify if the subscriber submits the connection request via a private terminal or via a public terminal. Terminals are considered private terminals when the charges are assigned to a single subscriber. These are, for example, terminals that are connected to the communication network KN via a private line or a company line. Public terminals, on the other hand, are terminals which can be used by several people and where each individual user is charged for each corresponding connection. Terminals of this type are, for example, coin-operated and card-operated terminals provided in a public or a private setting (club telephones).

These parameters are determined from the telephone number of the terminal used by the subscriber to submit the service request. The telephone number is determined via the switching facility EX1. However, these parameters may also be determined through the network management facility NMC or other network management facilities.

In addition, parameters are determined describing agreements between the network operator and the subscriber chargeable for a telephone installation. Such parameters are, for example, agreements concerning a charge limit and on an exclusion of the use of specific services.

It is also possible that additional parameters or only a limited number of the above parameters are determined. Or it may be decided not to determine these parameters at all, and the decision to send the message M4 could be based on other data or could be universal.

Based on the determined parameters, the following three situations are decided at the branch D1:

The subscriber is a subscriber with a conventional, private terminal, for example subscriber A.
  A subscriber with a credit card telephone whose creditworthiness is guaranteed by the credit card company, may also fall under this category.
The subscriber is a subscriber with a private terminal with an established credit limit, for example subscriber B.
The subscriber is a subscriber with a public terminal, for example subscriber C.

Depending on these parameters, the authorization unit AUT changes into the state STATE2, STATE3 or STATE4.

In the first case, the confirmation message M4 is sent without further verification. The state changes immediately from STATE2 to STATE5, whereafter the message M4 is sent in step S5.

In the second case, starting from the state STATE3 in the branch D2, it is checked if the subscriber has already exceeded his charge limit. In order to check the charge limit, messages are exchanged with the charge unit BILL which administers the data about the charge limit and the telephone account. This check also takes into account data about the anticipated charge for using the service which will be transmitted with the message M3 or which will be determined by accessing a data base. If the charge limit is not exceeded, the branch D2 will switch to the state STATE5. Otherwise, a switch to S3 will occur, wherein the subscriber will be alerted by, for example, a voice message that the charge limit is exceeded and will be given the opportunity to increase his charge limit, for example by entering a PIN number. These functions can also be executed by calling a service of the switching facility EX1, of the charge unit BILL or of the service control point SC. If the subscriber does not authorize an increase in the charge limit, the branch D3 will switch to the state STATE6. Otherwise, a second check is carried out in branch D2.

In the third case, starting from the state STATE4 in the branch D4, it is checked if a sufficient amount of money has been deposited in the coin receptacle or a sufficiently large credit balance is available on the card. The check for the branch D4 is carried out by exchanging messages with a corresponding service of the network management facility NMC, the switching facility EX1 or with a service provided by the service control points SC. If sufficient funds are available, the branch D4 will switch to the state STATE5. Otherwise, a switch to S4 will occur, wherein the subscriber will be asked by, for example, a voice message to put more money into the coin receptacle of the terminal or to use a new card. If the subscriber does not comply with this request, the branch D5 will switch to the state STATE6; otherwise, a second check is carried out in branch D4.

Starting from the state STATE5, the confirmation message M4 is sent in step S5 to the service-providing unit SAPP1, whereupon a change into STATE1 occurs. Starting from the state STATE6 which indicates that an authorization has been rejected, the connection from the subscriber to the service control point SC is being terminated as shown in step S6. It is also possible to transmit an additional voice message to the subscriber informing him that his service request has been rejected. It would also be possible to refrain from terminating the connection.

Figure 2B:
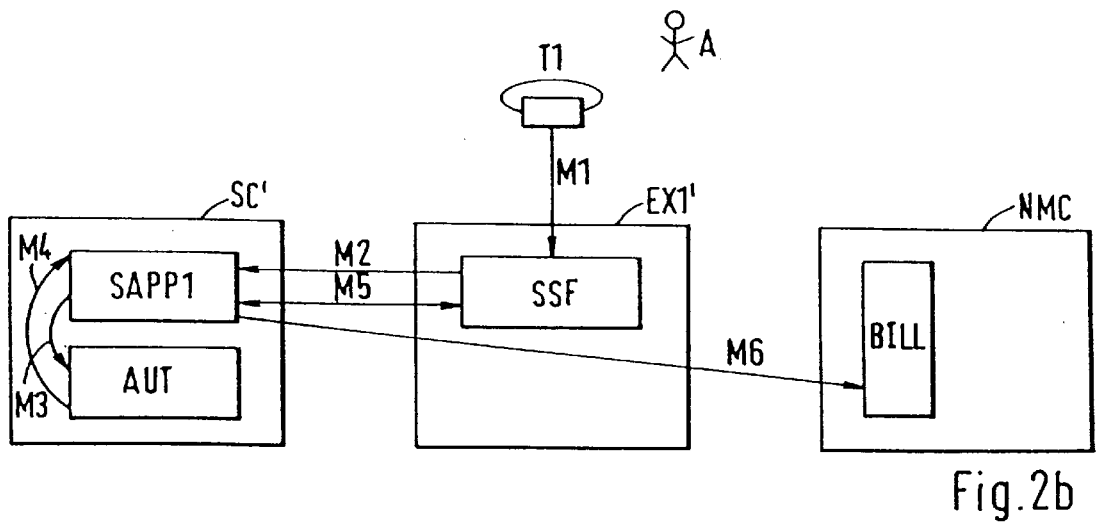
FIG. 2b shows a symbolic representation of the execution of the method of the invention for a second embodiment.

A second embodiment of the invention is described hereinafter with reference to FIG. 2b:

FIG. 2b shows the terminal T1 with the associated subscriber A, a service control point SC' with the service-providing unit SAPP1 and the authorization unit AUT, a switching facility EX1' and the network management facility NMC with the charge unit BILL. This communication arrangement corresponds to the communication arrangement of FIG. 1 and FIG. 2a, the difference being that the authorization unit AUT is not included in the switching facility EX1, but in the service control point SC'. Such arrangement of the authorization unit AUT is feasible since generally only the service-providing units SAPP1 and SAPP2 are controlled by the service provider and the underlying hardware and software platform is provided by the network operator.

Consequently, the process flow is as follows:

A service request from the subscriber A is transmitted by the messages M1 and M2 via the service switching unit SSF to the service-providing unit SAPP1. The service-providing unit SAPP1 requests via message M3 an authorization from the authorization unit AUT and renders the service upon receipt of the confirmation message M4. This communication takes place within the service control point SC', for example in the form of an interprocess communication between two software modules. In order to make a decision about the authorization, the authorization unit AUT must communicate with the switching facility EX1' or the network management facility NMC.

After the service has been rendered, the message M6 is sent to the charge unit BILL.

This embodiment is advantageous in that the communication between the service-providing unit SAPP1 and the authorization unit AUT is simplified and that the authorization unit AUT is capable of utilizing in a simple manner services provided by the service control point SC.

Figure 2C:
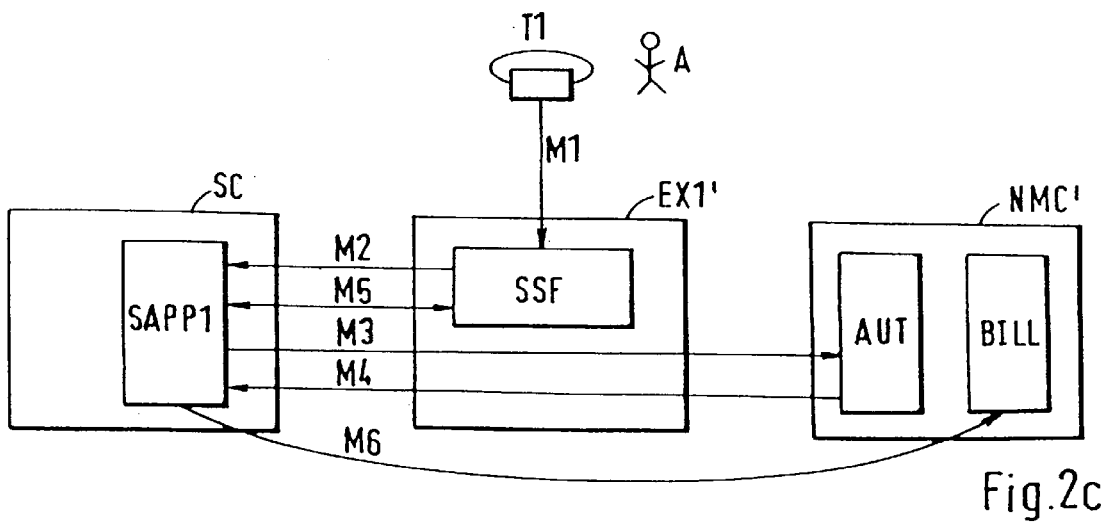
FIG. 2c shows a symbolic representation of the execution of the method of the invention for a third embodiment.

A third embodiment of the invention is described hereinafter with reference to FIG. 2c:

FIG. 2c shows the terminal T1, the associated subscriber A, the service control point SC with the service-providing unit SAPP1, the switching facility EX1' with the service switching unit SSF and a network management facility NMC' with the charge unit BILL and the authorization unit AUT. This communication arrangement corresponds to the communication arrangement of FIGS. 1, 2a and 3, the difference being that the authorization unit is not included in the switching facility EX1, but rather in the network management facility NMC'. The same applies to the communication flow, the only difference being that the messages M3 and M4 are exchanged between the service control point SC and the network management facility NMC'.

This embodiment is advantageous in that the authorization unit AUT can rather easily utilize services provided by the network management facility NMC, especially by the charge unit BILL. Consequently, the functionality of the authorization unit AUT is simplified. It is a further advantage that the authorization unit AUT can provide the authorization centrally for a variety of services of different service control points.

What is claimed is:

1. A method of charging for the use of a telecommunications service of a service provider, comprising the steps of routing a service request from a subscriber (A) through a telecommunications network (KN) of a network operator to a service-providing unit (SAPP1) of the service provider, and collecting the charge for the use of a telecommunications service by means of a charge unit (BILL) of the network operator, characterized in that the service-providing unit (SAPP1) requests an authorization from an authorization unit (AUT), that the service-providing unit (SAPP1) does not provide the requested telecommunications service until it receives a confirmation message (M4) from the authorization unit (AUT) of the network operator, that a charge message (M6) with data on a charge for the use of the telecommunications service is transferred from the service-providing unit (SAPP1) to the charge unit (BILL), and that the charge unit (BILL) collects the charge if the confirmation message (M4) has been provided.

2. A method as claimed in claim 1, characterized in that the charge message (M6) is transferred after provision of the service.

3. A method as claimed in claim 1, characterized in that a further message (M3) with data on the charge for the use of the telecommunications service is transferred to the authorization unit (AUT) prior to the provision of the service, and that based on these data of the further message, the authorization unit (AUT) decides on the transmission of the confirmation message (M4).

4. A method as claimed in claim 1, characterized in that the authorization unit (AUT) determines a parameter assigned to the subscriber (A), and decides on the transmission of the confirmation message (M4) based on said parameter.

5. A method as claimed in claim 4, characterized in that a first parameter stands for subscribers (A) with a normal subscriber station.

6. A method as claimed in claim 4, characterized in that a second parameter stands for subscribers (B) with a subscriber station to which a charge limit has been assigned.

7. A method as claimed in claim 4, characterized in that a third parameter stands for a subscriber (C) with a public terminal (T3), particularly a coin, chip-card, or club telephone.

8. A switching system (SS) for a telecommunications network (KN) of a network operator with a service switching unit (SSF) for routing a service request from a subscriber (A) to a service-providing unit (SAPP1) of a service provider, and with a charge unit (BILL) of the network operator for collecting charges for the use of a telecommunications service provided by the service-providing unit (SAPP1), characterized in that the switching system (SS) further comprises an authorization unit (AUT) which is designed to receive a request (M3) from the service providing service (SAPP1) so as to send to the service-providing unit (SAPP1) a confirmation message (M4) which causes the service-providing unit (SAPP1) to provide the telecommunications service, and that the charge unit (BILL) is designed to receive from the service-providing unit (SAPP1) a charge message (M6) with data on a charge for the use of the telecommunications service and to collect the charge if the confirmation message (M4) has been provided.

9. A service control point (SC) for telecommunications services, comprising an interface to a service switching facility (EX1) of a telecommunications network (KN), means for receiving a service request from a subscriber (A) via the service switching facility (EX1), and a service-providing unit (SAPP1) of a service provider for providing a telecommunications service in response the service request, characterized in that the service-providing unit (SAPP1) comprises means for sending a message (M3) to an authorization unit (AUT) and for receiving a confirmation message (M4) from the authorization unit (AUT) of the network operator, means for sending a charge message (M6) containing data on a charge for the use of a telecommunications service to a charge unit (BILL) of the network operator which serves to collect the charge if the confirmation message (M4) has been provided, and control means which are so designed that the requested telecommunications service is not provided until the confirmation message (M4) is received.

10. A service control point (SC) as claimed in claim 9, characterized in that the authorization unit (AUT) is contained in the service control point (SC).

11. A network management facility (NMC) of a network operator for a telecommunications network (KN) including a service switching facility (EX1) for routing a service request from a subscriber to a service-providing unit (SAPP1) of a service provider, the network management facility (NMC) comprising a charge unit (BILL) of the network operator for charging for the use of a telecommunications service provided by the service-providing unit (SAPP1), characterized in that the network management facility (NMC) further comprises an authorization unit (AUT) designed to receive a message (M3) from the service-providing unit (SAPP1) and to send to the service-providing unit (SAPP1) a confirmation message (M4) which causes the service-providing unit (SAPP1) to provide the telecommunications service, and that the charge unit (BILL) is designed to receive from the service-providing unit (SAPP1) a charge message (M6) with data on a charge for the use of the telecommunications service and to collect this charge if the confirmation message (M4) has been provided.

* * * * *